(12) United States Patent
Eyer

(10) Patent No.: US 10,419,811 B2
(45) Date of Patent: Sep. 17, 2019

(54) PVR HYPERLINKS FUNCTIONALITY IN TRIGGERED DECLARATIVE OBJECTS FOR PVR FUNCTIONS

(75) Inventor: Mark Kenneth Eyer, Woodinville, WA (US)

(73) Assignee: Saturn Licensing LLC, New York, NY (US)

( * ) Notice: Subject to any disclaimer, the term of this patent is extended or adjusted under 35 U.S.C. 154(b) by 376 days.

(21) Appl. No.: 13/039,005

(22) Filed: Mar. 2, 2011

(65) Prior Publication Data

US 2011/0299827 A1 Dec. 8, 2011

Related U.S. Application Data

(60) Provisional application No. 61/375,415, filed on Aug. 20, 2010, provisional application No. 61/354,515, (Continued)

(51) Int. Cl.
*H04N 21/858* (2011.01)
*H04N 21/433* (2011.01)
(Continued)

(52) U.S. Cl.
CPC ....... *H04N 21/4345* (2013.01); *H04N 21/433* (2013.01); *H04N 21/4424* (2013.01); *H04N 21/458* (2013.01); *H04N 21/47217* (2013.01); *H04N 21/482* (2013.01); *H04N 21/858* (2013.01); *H04N 21/4758* (2013.01); *H04N 21/4782* (2013.01); *H04N 21/47202* (2013.01); *H04N 21/47214* (2013.01)

(58) Field of Classification Search
CPC .................. H04N 21/858; H04N 21/4345

USPC ........................................................ 386/230
See application file for complete search history.

(56) References Cited

U.S. PATENT DOCUMENTS 5,900,905 A 5/1999 Shoff et al.
5,903,262 A 5/1999 Ichihashi et al.
(Continued)

FOREIGN PATENT DOCUMENTS

EP 2 577 970 A1 4/2013
JP 2002-353924 12/2002
(Continued)

OTHER PUBLICATIONS

Albrecht, "TV Multi-Taskers Can Get Jacked," The GigaOm Network, Mar. 15, 2008.
(Continued)

*Primary Examiner* — Thai Q Tran
*Assistant Examiner* — Jose M Mesa
(74) *Attorney, Agent, or Firm* — Oblon, McClelland, Maier & Neustadt, L.L.P.

(57) ABSTRACT

A method consistent with certain implementations involves receiving a triggered declarative object (TDO) at a digital television receiver device that carries out a programmed routine when user activated; the TDO further including a scripted control object that when activated by the viewer implements a Personal Video Recorder (PVR) function; and executing the TDO to cause the TDO to generate a signal that presents the scripted control object. This abstract is not to be considered limiting, since other embodiments may deviate from the features described in this abstract.

23 Claims, 4 Drawing Sheets

Related U.S. Application Data filed on Jun. 14, 2010, provisional application No. 61/352,275, filed on Jun. 7, 2010.

(51) Int. Cl.
| | | |
|---|---|---|
| H04N 21/458 | (2011.01) | |
| H04N 21/482 | (2011.01) | |
| H04N 21/4782 | (2011.01) | |
| H04N 21/434 | (2011.01) | |
| H04N 21/442 | (2011.01) | |
| H04N 21/472 | (2011.01) | |
| H04N 21/475 | (2011.01) | |

(56) References Cited

U.S. PATENT DOCUMENTS

| | | |
|---|---|---|
| 6,330,719 B1 | 12/2001 | Zigmond et al. |
| 6,604,242 B1 | 8/2003 | Weinstein et al. |
| 6,651,251 B1 | 11/2003 | Shoff et al. |
| 6,732,179 B1 | 5/2004 | Brown et al. |
| 7,028,327 B1 | 4/2006 | Dougherty et al. |
| 7,103,903 B1 | 9/2006 | Kydd |
| 7,284,202 B1 | 10/2007 | Zenith |
| 7,421,741 B2 | 9/2008 | Phillips, II et al. |
| 7,697,068 B2 | 4/2010 | Aratani et al. |
| 7,987,491 B2 * | 7/2011 | Reisman ............... 725/112 |
| 8,156,237 B2 | 4/2012 | Suh et al. |
| 8,270,819 B2 | 9/2012 | Vannier |
| 8,937,685 B1 | 1/2015 | Ho et al. |
| 2001/0034787 A1 | 10/2001 | Takao et al. |
| 2002/0083438 A1 | 1/2002 | So et al. |
| 2002/0056129 A1 | 5/2002 | Blackketter et al. |
| 2002/0097984 A1 | 7/2002 | Abecassis |
| 2002/0118954 A1 | 8/2002 | Barton et al. |
| 2002/0129374 A1 | 9/2002 | Freeman et al. |
| 2002/0162118 A1 | 10/2002 | Levy et al. |
| 2002/0184314 A1 | 12/2002 | Riise |
| 2002/0194620 A1 | 12/2002 | Zdepski |
| 2003/0018529 A1 | 1/2003 | Treloar |
| 2003/0018745 A1 | 1/2003 | McGowen et al. |
| 2003/0018971 A1 | 1/2003 | McKenna, Jr. |
| 2003/0018977 A1 * | 1/2003 | McKenna ............... 725/115 |
| 2003/0033607 A1 | 2/2003 | Schwalb |
| 2003/0070169 A1 | 4/2003 | Beyers, II et al. |
| 2003/0122966 A1 | 7/2003 | Markman et al. |
| 2003/0188321 A1 | 10/2003 | Shoff et al. |
| 2003/0204854 A1 * | 10/2003 | Blackketter ............ H04N 7/088 725/113 |
| 2004/0022278 A1 | 2/2004 | Thomas et al. |
| 2004/0031058 A1 | 2/2004 | Reisman |
| 2004/0078822 A1 | 4/2004 | Breen et al. |
| 2004/0139463 A1 | 7/2004 | Aratani et al. |
| 2004/0237120 A1 | 11/2004 | Lewin et al. |
| 2004/0261127 A1 | 12/2004 | Freeman et al. |
| 2004/0268410 A1 | 12/2004 | Barton et al. |
| 2005/0028195 A1 | 2/2005 | Feinleib et al. |
| 2005/0148296 A1 | 7/2005 | Kopra et al. |
| 2005/0155067 A1 | 7/2005 | McKenna, Jr. |
| 2005/0160461 A1 | 7/2005 | Baumgartner et al. |
| 2006/0123451 A1 | 6/2006 | Preisman |
| 2006/0271971 A1 | 11/2006 | Drazin |
| 2007/0061724 A1 | 3/2007 | Slothouber et al. |
| 2008/0082922 A1 | 4/2008 | Biniak et al. |
| 2008/0126477 A1 | 5/2008 | Kim |
| 2008/0145034 A1 | 6/2008 | Barton |
| 2008/0244678 A1 | 10/2008 | Kim et al. |
| 2008/0263619 A1 | 10/2008 | Olsen et al. |
| 2008/0271971 A1 | 11/2008 | Schuck et al. |
| 2009/0055871 A1 | 2/2009 | Song et al. |
| 2009/0144768 A1 | 6/2009 | Nagaraja |
| 2010/0011405 A1 | 1/2010 | Wu |
| 2010/0021130 A1 | 1/2010 | Shiragaki et al. |
| 2010/0050070 A1 | 2/2010 | Suh et al. |
| 2010/0050217 A1 | 2/2010 | Suh et al. |
| 2010/0075591 A1 | 3/2010 | Eyer et al. |
| 2010/0131983 A1 | 5/2010 | Shannon et al. |
| 2010/0134701 A1 | 6/2010 | Eyer |
| 2010/0180007 A1 | 7/2010 | Suh et al. |
| 2010/0218223 A1 | 8/2010 | Simpson et al. |
| 2010/0293586 A1 | 11/2010 | Simoes Rodrigues et al. |
| 2010/0309387 A1 | 12/2010 | Eyer |
| 2011/0001885 A1 | 1/2011 | Eyer |
| 2011/0004907 A1 | 1/2011 | Ryer |
| 2011/0004908 A1 | 1/2011 | Eyer |
| 2011/0004910 A1 | 1/2011 | Eyer |
| 2011/0010746 A1 | 1/2011 | Howarter et al. |
| 2011/0029898 A1 | 2/2011 | Malik |
| 2011/0298981 A1 | 12/2011 | Eyer |
| 2011/0302599 A1 | 12/2011 | Eyer |
| 2012/0066733 A1 | 3/2012 | Eyer |
| 2012/0216229 A1 | 8/2012 | Eyer |
| 2012/0297434 A1 | 11/2012 | Mickle et al. |
| 2012/0297436 A1 | 11/2012 | Eyer |
| 2013/0167172 A1 | 6/2013 | Suh et al. |
| 2013/0268631 A1 | 10/2013 | Suh et al. |
| 2013/0268987 A1 | 10/2013 | Eyer |
| 2013/0340021 A1 | 12/2013 | Eyer |
| 2014/0123174 A1 | 5/2014 | Suh et al. |
| 2014/0223484 A1 | 8/2014 | Song et al. |
| 2014/0250209 A1 | 9/2014 | Suh et al. |
| 2014/0250478 A1 | 9/2014 | Suh et al. |
| 2014/0337908 A1 | 11/2014 | Simoes Rodrigues et al. |

FOREIGN PATENT DOCUMENTS

| | | |
|---|---|---|
| JP | 2006-527556 | 11/2006 |
| JP | 2010-28691 | 2/2010 |
| JP | 2010-515291 | 5/2010 |
| WO | WO 2002/045406 | 6/2002 |
| WO | WO 2009/057050 | 5/2009 |
| WO | WO2011156035 A1 | 12/2011 |

OTHER PUBLICATIONS

Anonymous, "TiVo Series3 HD DVR (32 HD Hours) Product Summary," CNET Editor's Review, Sep. 11, 2006 (Updated Sep. 4, 2008).

Freeman, "Implementing the ATSC PSIP Standard," Softprose Inc., Oct. 26, 2006.

Huang et al., "Performance Analysis of Data Placement and Retrieval Schemes for Video Servers Based on Response Time Guaranteed," IEEE Explore, Sep. 1997.

Shuck, "Roundbox's Mobile TV Widgets Marry Mobile TV, Web," Broadcast Engineering, May 5, 2009.

Soares, "Interactive Television in Brazil: System Software and the Digital Divide," Telemidia Lab Catholic University of Rio De Janiero, 2007.

Verizon, "Verizon Launches New Wave of Interactive Features for FiOS TV Customers in North Texas," Verizon News Release, Oct. 24, 2008.

Verizon, "Verizon Ushers in a New Era of Television Entertainment With the Debut of FiOS TV in Allentown, PA," Verizon PR Newswire, Nov. 4, 2009.

Williams et al., "Virtual Personalised Channels: Video Conducting of Future TV Broadcasting," EWIMT 2005: Second European Workshop on the Integration of Knowledge, Semantic and Digital Media Technologies, Dec. 2005.

Extended European Search Report dated Dec. 3, 2014 in Patent Application No. 11792810.1.

Extended European Search Report dated Dec. 3, 2014 in Patent Application No. 11792811.9.

Extended European Search Report dated Dec. 3, 2014 in Patent Application No. 11792812.7.

Extended European Search Report dated Dec. 3, 2014 in Patent Application No. 11792815.0.

"DTV Application Software Environment Level 1 (DASE-1) Part 2: Declarative Applications and Environment" ATSC Standard, Advanced Television Systems Committee, XP055154195, Mar. 2003, 143 pages.

(56) References Cited

OTHER PUBLICATIONS

"DTV Application Software Environment Level 1 (DASE-1) Part 1: Introduction, Architecture, and Common Facilities" ATSC Standard, Advanced Television Systems Committee, XP055154189, Mar. 2003, 66 pages.
"ATSC Candidate Standard: Non-Real-Time Content Delivery" Advanced Television Systems Committee, XP055154192, Dec. 2010, 118 pages.
"A/93, ATSC Standard: Synchronized/Asynchronous Trigger" Advanced Television Systems Committee, XP030001593, Apr. 2002, 25 pages.
"A/65:2009, ATSC Standard: Program and System Information Protocol for Terrestrial Broadcast and Cable (PSIP)" Advanced Television Systems Committee, XP030001580, Apr. 2009, 148 pages.
Office Action dated Mar. 31, 2016 in Chinese Patent Application No. 201180026820.2 (with English translation).
Office Action dated Apr. 4, 2016 in Korean Patent Application No. 10-2013-7034319 (with English translation).
Office Action dated Jan. 31, 2014 in Mexican Patent Application No. Mx/a/2012/014279 (with English translation).
Office Action dated Jan. 31, 2014 in Mexican Patent Application No. Mx/a/2012/014147 (with English translation).
Office Action dated Jul. 16, 2015 in Chinese Patent Application No. 201180026830.6 (with English translation).
Office Action dated Jul. 17, 2015 in Chinese Patent Application No. 201180026626.4 (with English translation).
Office Action dated Mar. 31, 2016 in Chinese Patent Application No. 201180026626.4 (with English translation).
Office Action dated May 11, 2015 in Chinese Patent Application No. 201180026822.1 (with English translation).
Office Action dated Dec. 28, 2015 in Chinese Patent Application No. 201180026822.1 (with English translation).
Office Action dated Apr. 2, 2014 in Mexican Patent Application No. Mx/a/2012/013880 (with English translation).
Office Action dated Jul. 13, 2015 in Chinese Patent Application No. 201180026820.2 (with English translation).
Office Action dated May 15, 2015 in Korean Patent Application No. 10-2011-7008946 (with English translation).
Office Action dated Apr. 12, 2013 in Korean Patent Application No. 10-2011-7008432 (with English translation).
Office Action dated Apr. 29, 2013 in Korean Patent Application No. 10-2011-7008926 (with English translation).
Office Action issued Apr. 25, 2013 in Korean Patent Application No. 10-2011-7008125 (with English translation).
Monica Pawlan; "Introduction to Digital TV Applications Programming", Feb. 2001—http://web.archive.org/web/20091125014428/http://pawlan.com:80/monica/articles/itv/ ; Aug. 5, 2018, 7 pages.
Mexican Office Action dated May 24, 2013 in Application No. MX/a/2012/014141 (with English translation), 5 pages.
Canadian Office Action dated Apr. 12, 2018 in Application No. 2,801,702, 4 pages.
Canadian Office Action dated Mar. 3, 2017 in Application No. 2,801,702, 4 pages.
Canadian Office Action dated Apr. 9, 2018 in Application No. 2,801,750, 4 pages.
Verizon; "Verizon Launches New Wave of Interactive Features for FiOS TV Customers in North Texas", Verizon News Release; Oct. 24, 2008, 4 pages.

\* cited by examiner

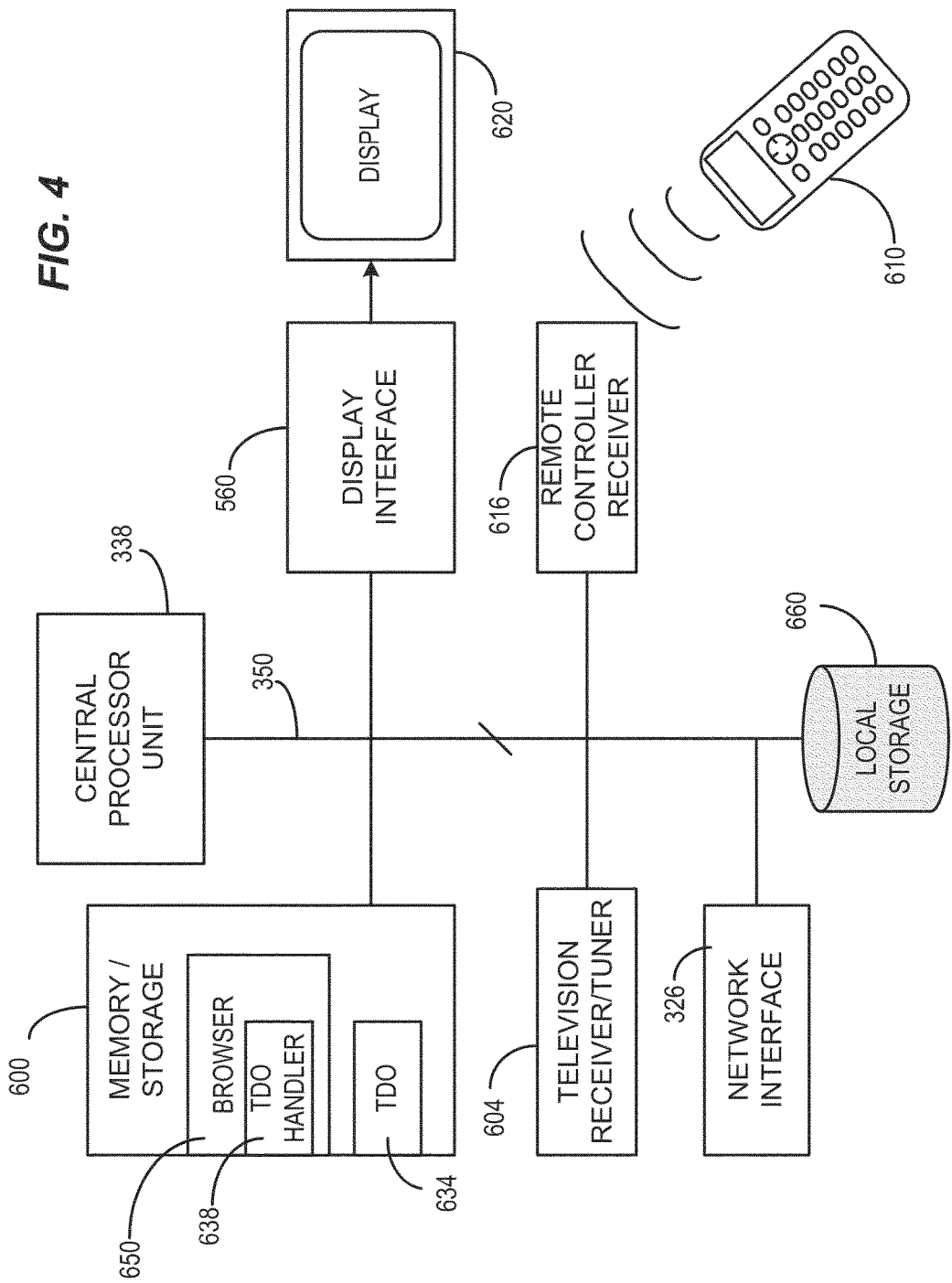

PVR HYPERLINKS FUNCTIONALITY IN TRIGGERED DECLARATIVE OBJECTS FOR PVR FUNCTIONS

CROSS REFERENCE TO RELATED DOCUMENTS

This application claims priority benefit of U.S. Provisional Patent Application No. 61/375,415 filed Aug. 20, 2010 entitled "Scripted Access to Hidden Multimedia Assets" to Mark Eyer, and also claims priority benefit of U.S. Provisional Patent Application No. 61/354,515 filed Jun. 14, 2010 entitled "Hyperlinks in Synchronized Widgets" to Mark Eyer, and claims priority benefit of U.S. Provisional Patent Application No. 61/352,275 filed Jun. 7, 2010 entitled "Widgets for Non-Real-Time Services" to Mark Eyer, each of which is hereby incorporated herein by reference. This application is also related to U.S. patent application Ser. No. 13/038,984 entitled "Scripted Access to Hidden Multimedia Assets" to Mark Eyer and to U.S. patent application Ser. No. 13/038,939 entitled "TV-Centric Actions in Triggered Declarative Objects" and to U.S. patent application Ser. No. 13/038,967 entitled "Scripted Interactivity for Non-Real-Time Services" to Mark Eyer, each of which are filed of even date herewith and are hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

A Triggerable Declarative Object (TDO) (also sometimes known as a "Triggered Downloadable Object) is a downloadable object created by a content creator or service provider, which includes declarative content (text, graphics, scripts, and audio) whose function and behavior is tied in some way to digital television programming that it accompanies. Standards defining TDOs may be devised to specify associated available behaviors, appearance, trigger actions, and transport methods for content and metadata.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 4 is a processor-centric block diagram of an example digital television receiver device consistent with certain embodiments of the present invention.

DETAILED DESCRIPTION

Figure 1:
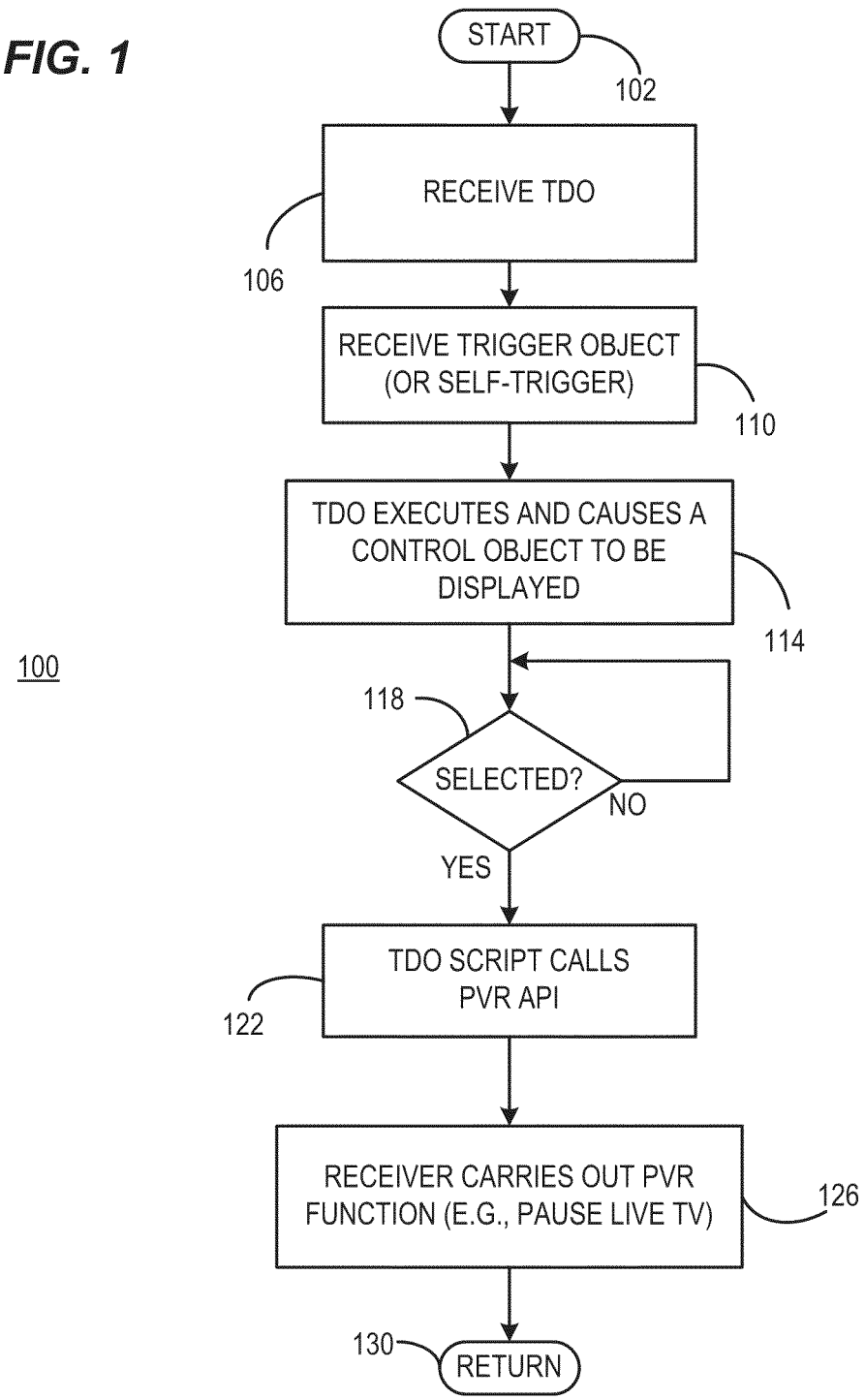
FIG. 1 is a flow chart of an example process executed at a digital television receiver device in a manner consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a program module, a script, a procedure, an object method, an object implementation, in an executable application, an applet, a servlet, a source code, a script, a program module, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide. In this discussion, the use of the term "Program" is also generally consistent with that of the MPEG-2 Systems standard (ISO/IEC 13818-1). An MPEG-2 Program has the associated Elementary Stream components, such as for example one video Elementary Stream and one or more audio Elementary Streams.

Reference throughout this document to "one embodiment", "certain embodiments", "an embodiment", "an implementation", "an example" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As used herein, the term personal video recorder (PVR) action is defined to mean an action that can normally result from a PVR executing a command issued by a viewer such as recording a television program, scheduling the recording of a future program, playing back previously-recorded content, pause live TV, get a "season pass" for a particular program, record a previously presented episode, go to "Now Playing List", view a category of programs, go to a previously recorded list, select recording options, manage scheduled recordings, manage a series of recordings, view a recording log, view recorded content with a particular sorting, view a list of scheduled recordings, etc.

For purposes of this document, the terms "Synchronized Widget", "Triggered Downloadable Object", "Triggered Declarative Object", and "Triggerable Declarative Object" and similar terms are used synonymously and interchangeably. Use of this term and related terms are generally as defined and explained in detail in U.S. patent application Ser. No. 12/959,529 filed Dec. 3, 2010 entitled "Announcement of Triggered Declarative Objects" to Blanchard et al. which is hereby incorporated by reference. However, the Blanchard application defines the content of the TDO and trigger somewhat more rigorously than is required in the general cases since many attributes defined therein as being a part of a TDO could be situated in the trigger or vice versa or not present at all depending upon the function and triggering of a particular TDO. As used herein, the term Triggered Declarative Object or Triggerable Declarative Object (TDO) is a downloadable software object created by a content creator or service provider. Generally, such objects have declarative content (text, descriptive markup, graphics, scripts, and audio) whose function and behavior is tied in some way to the television programming that it accompanies. The TDO, in examples shown herein, are received from a service provider in advance of a time defined by the action of a trigger (as explained below) so that the TDO is available when the trigger arrives. Moreover for a given TDO instance, an explicit trigger signal may not be necessary and a TDO may be self triggering or triggered by some action other than receipt of a trigger signal. Various standards bodies may define associated available behaviors, appearance, trigger actions, and transport methods for content and metadata for a TDO. Additionally, requirements regarding timing accuracy of TDO behaviors relative to audio/video may be defined by standards bodies.

As used herein a "trigger" or "announcement trigger" is a data object, bound to a particular program segment that references the location where a TDO may be acquired, such as a file name or identifier for a file that has already been downloaded via non-real-time (NRT) services. Certain TDOs will only make sense in conjunction with a certain program. An example is a TDO that collects viewer response data, such as voting on a game show or contest.

With regard to the exact nature of TDOs and triggers, certain information can be provided in either the TDO or the trigger without limitation. However, the two objects operate in cooperation to produce a desired function when the TDO is executed in a digital television receiver device's internal processor.

The present subject matter involves a user interaction with a TDO which causes a PVR action or function such as recording a linear-broadcast television program or retrieving an item of non-real-time (NRT) content. The term "linear-broadcast television" is used here to refer to regular television broadcasting involving real-time delivery of programming content on a predetermined schedule, as opposed to "on-demand" or non-real-time (NRT) delivery methods. Interaction with the TDO could result in the delivery or playback of content delivered in the ATSC Non-Real-Time delivery system (via files in a FLUTE transport for example as disclosed in U.S. patent application Ser. No. 12/584,171 filed Sep. 1, 2009 entitled "Non-Real Time Services" to Eyer, which is hereby incorporated by reference, or making a selection that results in the receiver scheduling the download of a specific item of NRT content. Some NRT content is low-latency; selection of that type of content could result in playback as soon as it was retrieved.

The general concept of a TDO involves an object having text, descriptive markup (e.g. HTML, etc.), graphics, and scripts (e.g., ECMAScript, etc.) whose functionality is in some way tied to the television programming that the TDO accompanies. The functionality may, for example, exist only for the duration of an advertisement. Or, the functionality may exist and be usable during the program but disappear during the ad segments.

The user can interact with the TDO, for example to configure it to operate in certain ways. A "player monitor" TDO, for example, could allow the user to configure the television to monitor baseball players that are of interest, so the statistics and game performance of those players can be monitored and displayed. A financial portfolio TDO could be configured with the ticker symbols of companies the user is interested in monitoring.

The present subject matter pertains to Triggered Declarative Objects (TDOs) as described above. The concept of a TDO is expected to be standardized in a next-generation broadcast service. TDOs include declarative content (like text, markup, graphics, and scripting like ECMA 262 [a.k.a. JavaScript]) whose behavior and presentation is tied to the programming it accompanies, and even to the specific on-screen program content at a given moment.

A suitably-equipped receiver consistent with certain implementations hereof has some amount of available storage for the purpose of recording non-real-time (NRT) content for later playback. One expected purpose envisioned for the storage is for NRT content, but this is not to be considered to be a limitation in any sense on the presently disclosed subject matter.

The capability of the TDO can be extended in accord herewith to facilitate the functioning of an advanced broadcast receiver with regard to recording of linear television programming. In an exemplary Personal Video Recorder (PVR—also known as a digital video recorder or DVR), the user browses a schedule of programming and chooses a program or series of programs for the recorder to capture. By such user interaction, the PVR creates a "to do" list of channels to visit at certain times to make recordings.

In accord with example implementations consistent with the present invention, the functionality of the TDO can be extended. The extension of TDO functionality described here allows the author of the TDO to offer the user an option to create such a scheduled recording, of the present program (e.g. the program carrying the TDO) or of another referenced program, such as (but not limited to) NRT content, the next following program, or some other program being broadcast at a future specified time on a specified channel. The script binding delivers the appropriate metadata via the TDO to allow the host receiver to identify the program or NRT content and set up the recording, in the same way that it would have done had the user selected that program from a program guide and hit the "record" button on their PVR.

Hence, by use of the present techniques, the power, versatility, and utility of the TDO can be extended, to provide a broadcaster with a richer toolset from which to work when creating an interactive experience.

In accord with implementation examples, a TDO can facilitate and enable scripted control over the selection and set-up of PVR-related functionality in the advanced television receiver. In certain examples, when a Triggered Declarative Object is executing, the user's experience is similar to accessing a website with a browser, with the following exceptions:

- the background image can be the linear (or NRT) video content;
- thus, text/graphics can be overlaid onto the video content by the TDO;
- the TDO can also choose to scale and position the video content into a window on the screen;
- TDOs can accept "triggers" and metadata during their operation, so that their appearance and behavior are synchronized to the action and events in the programming they accompany; and
- the TDO author has access, via script extensions, to a number of functions and items of metadata that may be helpful to the operation of the TDO.

When a TDO includes PVR functionality, a viewer first sees a display resulting from invocation by a trigger of a TDO script in accord with examples of the present teachings. The scripting application program interface (API) is utilized by the TDO wherein a request is made to the host digital television receiver to set up, for example, a PVR recording of a program. The program to be recorded (or played) can be identified by various mechanisms including its channel identifier (virtual channel number or service ID), date and time, and duration. While it is envisioned that the primary PVR function triggered by execution of a TDO consistent with the present teachings will be a recording function (e.g., a user executed command option to "record this program"), this is not to be considered limiting since other PVR functions can also be triggered (e.g., play of low latency NRT content such as a weather radar image that can be displayed in a television window during a weather emergency, pause live TV, play an item of stored content created from a live broadcast, etc.).

Referring now to FIG. 1, a flow chart 100 depicts an example process carried out in a manner consistent with certain implementations of the present invention starting at 102. At 106 a TDO is received from the service provider or broadcaster. At a later time, a trigger object is received, again from the service provider or broadcaster at 110. At an appropriate time determined by the trigger object, the TDO executes at 114. This action, in this implementation, causes an announcement to be displayed on the television display providing the viewer the opportunity to select an on-screen control that can cause any suitable PVR function (e.g., begin recording the current program, pause live TV, etc.) to be carried out.

If the viewer selects the control at 118, the control is executed, resulting in the TDO script calling an API function at 122. A processor in the digital television receiver device responds to the API call at 126 causing the PVR function defined by the TDO to be carried out. The routine then returns at 130 and the process then proceeds to whatever function is defined by the TDO or to a default state of operation of the television receiver device.

In other implementations, the TDO's PVR function action may be self-triggering (e.g. the TDO may be executed without the receipt of any trigger object) without limitation.

Figure 2:
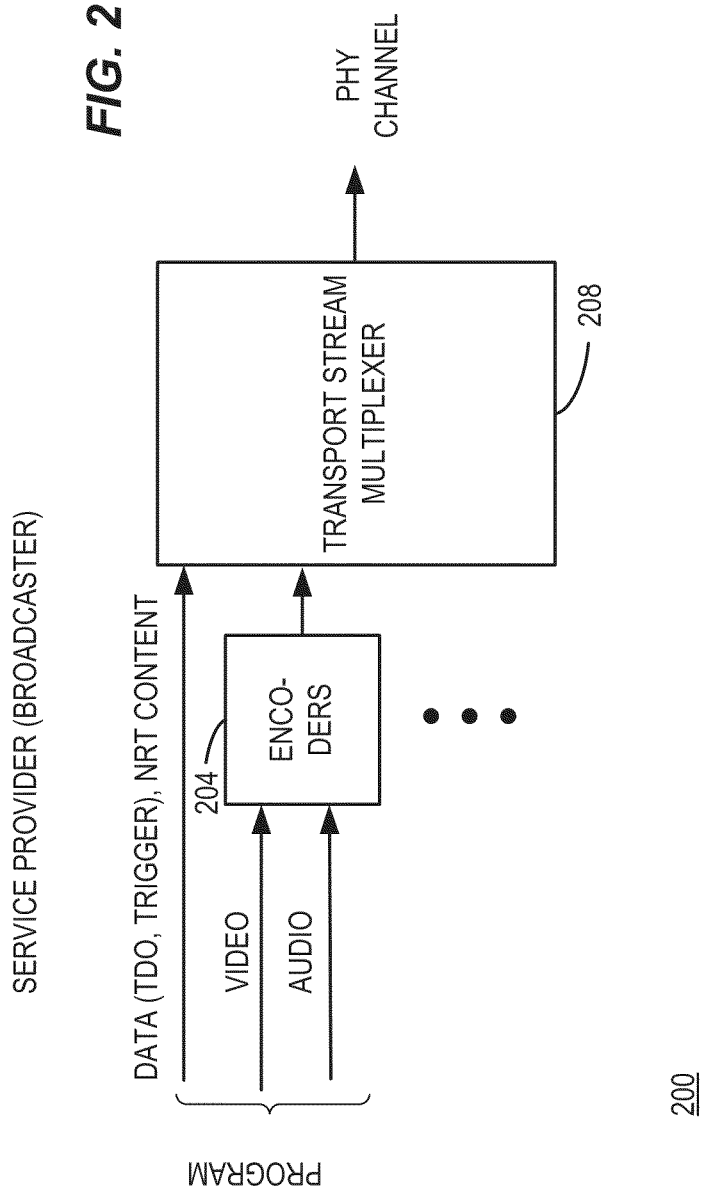
FIG. 2 is a block diagram of an example transmission-side system that assembles digital television content in a manner consistent with certain embodiments of the present invention.

Referring now to FIG. 2, a basic diagram of an example service provider such as a broadcaster is depicted as 200. Generally speaking, a single service provider may provide multiple programs over one or more transport streams. The audio, video, caption data, etc. are provided to an encoder which encodes the data into packets suitable for distribution. The audio and video program material is encoded by audio and video encoders 204 which are then provided to a transport stream multiplexer 408 which then provides an output that can be distributed via a physical channel medium such as cable or satellite broadcast. In this discussion, the use of the term "Program" is generally consistent with that of the MPEG-2 Systems standard (ISO/IEC 13818-1). An MPEG-2 Program includes associated Elementary Stream components, such as for example one video Elementary Stream and one or more audio Elementary Streams. In accord with the implementation described above, the TDO data and its associated trigger data as well as (optionally) NRT content are also provided to the transport stream multiplexer for incorporation into the transport stream using any suitable coding. Multiple such program streams may be provided for and encoded and multiplexed into the transport stream at 208.

Thus, at a service provider, a data stream may be assembled that includes a stream which pre-delivers a TDO to a digital television receiver device that carries out a programmed routine when the TDO is user activated. The TDO can include a control object that when selected by the viewer implements a PVR-related action. The stream can further deliver one or more trigger objects associated with the TDO to the television receiver device, where the trigger object causes execution of the TDO.

Figure 3:
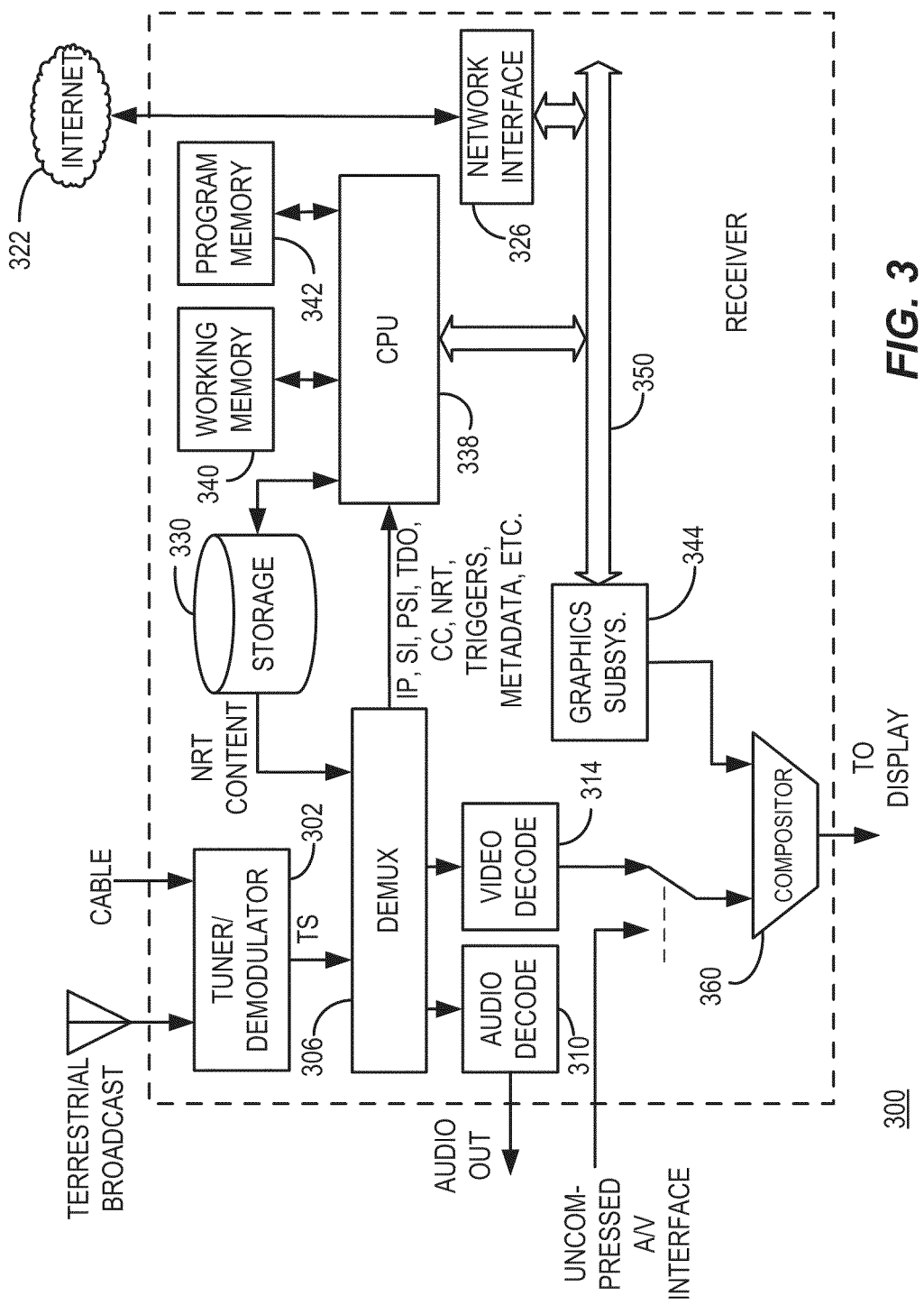
FIG. 3 is a block diagram of an example digital television receiver device consistent with certain embodiments of the present invention.

A receiver device is depicted as receiver 300 in FIG. 3 wherein content is received via any suitable source such as terrestrial broadcast, cable or satellite at a receiver 300's tuner/demodulator 302. The transport stream including the caption data, TDOs, triggers, etc. from the tuner/demodulator 302 is demultiplexed at demultiplexer 306 into audio and video streams. The audio is decoded at an audio decoder 310 while the video is decoded at a video decoder 314. Uncompressed A/V data may also be received via an uncompressed A/V interface 318 that can be selectively utilized.

A/V content including TDOs, data and triggers may also be received via the Internet 322 via a network interface 326. Additionally, storage 330 can be provided for non-real time (NRT) or Internet-delivered stored content such as Internet Protocol Television (IPTV). The stored content can be played by demultiplexing at 306 in a manner similar to that of other sources of content. The receiver generally operates under control of one or more processors such as CPU 338 which is interconnected to working memory 340 and program memory 342 as well as a graphics subsystem 344 via one or more buses such as 350.

The CPU 338 receives closed caption data from the demultiplexer 306 as well as any other information such as TDO announcements and electronic programming guides used for rendering graphic content and passes the information to the graphics subsystem 344 and the images are composited at the compositor and video interface 360 to produce an output suitable for display on a video display.

The CPU 338 operates to carry out various processes within the context of the subject matter disclosed herein including triggering scripts and operations such as making a call to a URL specified by the TDO or trigger. CPU 338 further operates to execute any script objects (control objects) contained in the TDO and/or its trigger(s).

CPU 338 also operates to oversee control of the digital television receiver including the tuner/demodulator 302 and other television resources. Connection to such systems is not shown to avoid cluttering the drawing, but will be understood by those skilled in the art upon consideration of the present teachings. Hence, when the CPU 338 executes a PVR command consistent with the teachings herein, the CPU 338 is enabled to issue an API call that initiates a PVR function such as storing a television program or an item of NRT content as dictated by the TDO's PVR command execution scripting.

The operation in processing TDOs is depicted in a more processor-centric view in FIG. 4. Memory and storage 330, 340 and 342 are depicted collectively as 600 in FIG. 4 for convenience. Similarly, the various demodulators, decoders, etc. that initially process digital television signals are collectively depicted as 604. The television receiver device of FIG. 4 is further depicted as having a remote controller 610 which communicates with a remote controller interface 616. Additionally, the display 620 is depicted explicitly for completeness and may represent either an integral display as in a television set or a connected display device.

Memory 600 contains various functional program modules and data. When a TDO object is received, the TDO 634 is stored at memory 600 along with a hyperlink or other triggered control object that when activated will cause execution of a PVR related action when triggered and executed on CPU 338. This TDO storage and execution is carried out at TDO handler 638 which may be integral to a interactivity manager 650. The TDO, when executed may present an announcement, generally defined within the TDO, to the viewer which permits the viewer to execute a PVR command by selection of the control object (e.g., by use of remote controller 610) as previously described. In certain implementations, when the PVR command is instituted, local storage 660 is utilized to store or retrieve content in a manner similar to conventional PVR operation.

Thus, a method consistent with certain implementations involves receiving a triggered declarative object (TDO) to a digital television receiver device that carries out a programmed routine when user activated; the TDO further including a scripted control object that when activated by the viewer implements a Personal Video Recorder (PVR) function on an identified item of program content; displaying the control object on a display; receiving a signal indicating user activation of the control object; and carrying out the said PVR function responsive to receipt of the signal, where the PVR function comprises retrieval and storage functions related to the said identified item of program content.

Another method involves receiving a triggered declarative object (TDO) at a digital television receiver device that carries out a programmed routine when user activated; the TDO further including a scripted control object that when activated by the viewer implements a Personal Video Recorder (PVR) function; and executing the TDO to cause the TDO to generate a signal that presents the scripted control object.

In certain implementations, the process further comprising displaying the control object on a display. In certain implementations, the process further comprising receiving a signal indicating activation by the user of the control object; and carrying out the PVR function responsive to receipt of the signal. In certain implementations, activation of the scripted control object results in recording a television program. In certain implementations, metadata in the TDO defines a target channel where the television program may be received. In certain implementations, activation of the scripted control object results in retrieval and storage of an item of non-real-time (NRT) program content specified in the TDO. In certain implementations, activation of the control object results in retrieval of an indicated item of stored program content and rendering of the item of the content. In certain implementations, the TDO contains a script with an application program interface (API) call that causes the television receiver to set up a PVR recording of a program, by providing a channel identifier, date and time, and duration. In certain implementations, the channel identifier comprises a virtual channel number or service identifier.

A storage device such as a non-transitory computer readable storage medium can store instructions which, when executed on one or more programmed processors, can carry out any of the methods described herein.

A device consistent with certain implementations has a processor and a digital television receiver device adapted to receive a triggered declarative object (TDO) to a digital television receiver device that carries out a programmed routine on the processor when user activated. The TDO has a scripted control object that when activated by the viewer implements a PVR function. The processor is programmed to execute the TDO to cause the TDO to generate a signal that presents the scripted control object.

In certain implementations, the processor is further programmed to cause the device to produce a signal that displays the scripted control object on a display. In certain implementations, the processor receives a signal indicating activation of the scripted control object and carries out instructions implementing the PVR function responsive to receipt of the signal. In certain implementations, activation of the scripted control object results in recording a television program. In certain implementations, metadata in the TDO defines a target channel where the television program may be found. In certain implementations, activation of the scripted control object results in retrieval and storage of an item of non-real-time (NRT) program content specified in the TDO. In certain implementations, activation of the scripted control object results in retrieval of an indicated item of content and rendering of the item of the content. In certain implementations, the TDO contains a script with an application program interface (API) call that causes the television receiver to set up a PVR recording of a program, by providing a channel identifier, date and time, and duration. In certain implementations, the channel identifier comprises a virtual channel number or service identifier.

Those skilled in the art will recognize, upon consideration of the above teachings, that certain of the above exemplary embodiments are based upon use of a programmed processor. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will appreciate, upon consideration of the above teachings, that the program operations and processes and associated data used to implement certain of the embodiments described above can be implemented using disc storage as well as other forms of storage such as non-transitory storage devices including as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. The term non-transitory does not suggest that information cannot be lost by virtue of removal of power or other actions. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in operational flow, user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method, comprising:
   receiving an application at a digital television receiver device that carries out a programmed routine when user activated, the application further including a scripted control object that when activated by the user implements a Personal Video Recorder (PVR) function on an identified item of program content;
   storing the application in a memory;
   receiving after the application is stored in the memory, via a broadcast stream or the Internet, control information that includes an identifier identifying the stored application to be executed by a processor, the control information and the application being provided separately;
   invoking, automatically in response to the received control information, execution of the stored application;
   displaying the control object on a display;
   receiving a signal indicating user activation of the control object; and
   carrying out, by the application being executed by the processor, the PVR function responsive to receipt of the signal, where the PVR function comprises retrieval and storage functions related to the said identified item of program content.

2. A method, comprising:
   receiving an application at a digital television receiver device that carries out a programmed routine when user activated, the application further including a scripted control object that when activated by the user implements a Personal Video Recorder (PVR) function;
   storing the application in a memory;
   receiving, after the application is stored in the memory, control information via a broadcast stream or the Internet, the control information and the application being provided separately;
   invoking, automatically in response to the received control information, execution of the stored application; and
   executing, by a processor, the stored application to cause presentation of the scripted control object.

3. The method according to claim 2, further comprising displaying the control object on a display.

4. The method according to claim 3, further comprising receiving a signal indicating activation by the user of the control object; and carrying out the PVR function responsive to receipt of the signal.

5. The method according to claim 2, where activation of the scripted control object results in recording a television program.

6. The method according to claim 5, where metadata in the application defines a target channel where the television program may be received.

7. The method according to claim 2, where activation of the scripted control object results in retrieval and storage of an item of non-real-time (NRT) program content specified in the application.

8. The method according to claim 2, where activation of the control object results in retrieval of an indicated item of stored program content and rendering of the indicated item of the stored program content.

9. The method according to claim 2, where the application contains a script with an application program interface (API) call that causes the digital television receiver device to set up a PVR recording of a program, by providing a channel identifier, date and time, and duration.

10. The method according to claim 9, where the channel identifier comprises a virtual channel number or service identifier.

11. A non-transitory computer readable storage medium storing instructions which, when executed on one or more programmed processors, carry out a method according to claim 2.

12. A device, comprising:
    circuitry configured to
      receive an application that carries out a programmed routine when user activated, the application further including a scripted control object that when activated by the user implements a PVR function,
      store the received application in a memory,
      receive, after the application is stored in the memory, control information via a broadcast stream or the Internet, the control information and the application being provided separately,
      invoke, automatically in response to the received control information, execution of the stored application; and
      execute the stored application to cause presentation of the scripted control object.

13. The device according to claim 12, where the circuitry outputs the scripted control object for display on a display.

14. The device according to claim 13, where the circuitry receives a signal indicating activation of the scripted control object and carries out instructions implementing the PVR function responsive to receipt of the signal.

15. The device according to claim 12, where activation of the scripted control object results in recording a television program.

16. The device according to claim 15, where metadata in the application defines a target channel where the television program may be found.

17. The device according to claim 12, where activation of the scripted control object results in retrieval and storage of an item of non-real-time (NRT) program content specified in the application.

18. The device according to claim 12, where activation of the scripted control object results in retrieval of an indicated item of content and rendering of the indicated item of the content.

19. The device according to claim 12, where the application contains a script with an application program interface (API) call that causes the circuitry to set up a PVR recording of a program, by providing a channel identifier, date and time, and duration.

20. The device according to claim 19, where the channel identifier comprises a virtual channel number or service identifier.

21. The method according to claim 1, where
the scripted control object is run on circuitry of the digital television receiver device; and
the identified item of program content is defined in the application.

22. The method according to claim 2, wherein the control information references a location of the application.

23. The method according to claim 2, further comprising:
receiving, during execution of the stored application, second control information via the broadcast stream or the Internet; and
executing the stored application based on the second control information such that an appearance or a behavior of the executed application is synchronized to an action or an event for content in the broadcast stream.

* * * * *